United States Patent [19]

Higashinaka et al.

[11] 4,061,221

[45] Dec. 6, 1977

[54] DUST CONTROLLING LOADING CHUTE APPARATUS FOR PARTICULATE MATERIAL

[75] Inventors: Koichi Higashinaka; Tetsuo Kai, both of Kumagaya, Japan

[73] Assignee: Hitachi Metals, Ltd., Tokyo, Japan

[21] Appl. No.: 766,822

[22] Filed: Feb. 8, 1977

[30] Foreign Application Priority Data

Feb. 13, 1976 Japan .................. 51-14019

[51] Int. Cl.² ................. B65G 65/32; B65G 11/14
[52] U.S. Cl. ............................ 198/524; 141/93; 193/30; 198/494; 198/536; 214/17 B; 214/17 CA
[58] Field of Search .................. 193/30; 198/493, 494, 198/524, 528, 536, 537; 214/17 B, 17 CA; 141/93; 302/34, 59

[56] References Cited

U.S. PATENT DOCUMENTS

| 2,365,240 | 12/1944 | Arnold | 193/30 |
|---|---|---|---|
| 2,772,764 | 12/1956 | McClellan | 193/30 |
| 3,241,581 | 3/1966 | Richardson et al. | 214/17 CA |
| 3,438,681 | 4/1969 | Lunde | 302/59 |
| 3,707,998 | 1/1973 | Dalrymple | 214/17 B |
| 3,739,893 | 6/1973 | Kaufmann | 141/93 |
| 3,858,733 | 1/1975 | Morioka et al. | 193/30 |
| 3,869,967 | 2/1975 | Garnett | 141/93 |
| 3,881,610 | 5/1975 | Hessling | 214/17 B |

Primary Examiner—John J. Love
Assistant Examiner—Jeffrey V. Nase
Attorney, Agent, or Firm—Sughrue, Rothwell, Mion, Zinn and Macpeak

[57] ABSTRACT

An apparatus for loading particulate materials includes a flexible discharge chute having an accordion outer pipe 7 surrounding an inner pipe 3 comprising a plurality of telescopingly nested skirt sections 4 connected by chains 5. A flared hood 8 having a flexible lower skirt 10 is connected to a support ring 13 at the lower end of the chute, and the hood has a plurality of air intake ports 11 and adjacent material detecting contact switches 12. A winding apparatus 14 for raising and lowering the hood, and simultaneously contracting or expanding the chute, is controlled by the switches 12. Dust particles swirling up under the hood and skirt are drawn up through the annular space between the inner and outer pipes to a collector and precipitator 15, which separates out the dust particles and returns them to the discharge chute.

10 Claims, 3 Drawing Figures

DUST CONTROLLING LOADING CHUTE APPARATUS FOR PARTICULATE MATERIAL

BACKGROUND OF THE INVENTION

The present invention relates to a discharge chute apparatus for loading dust laden, particulate materials, such as minute grains, pellets, powder lumps, etc, in freight cars, ship holds, storage bins, etc.

Conventionally, in discharging particulate materials from a supply source into loading receptacles or the like, various methods have been employed in order to restrict the environmentally contaminating dispersal of dust particles into the air. One method is to reduce the fall distance or the discharge speed of the materials. Another method is to employ filter devices. However, the discharge rate per hour is unacceptably low in the former method, and the filter mesh becomes clogged in the latter method, whereby the discharge operation must often be for stopped for cleaning.

To obviate these drawbacks, a plurality of straight pipe sections have been coaxially and slidingly engaged with each other to form an expandable chute, at the bottom of which a flexible, skirted hood has been provided. A suction pipe is then connected to the hood to draw in the dust generated in the space between the hood and the surface of the materials being discharged. The hood is adapted to be moved upwardly in response to the increasing height of the materials by retracting the expandable chute, whereby the hood remains positioned just above the surface of the discharging materials.

However, in such an apparatus substantial quantities of dust leak out between the sliding portions of the pipe sections, and their retraction is often hampered by the dust accumulating on the sliding surfaces thereof. Further, the suction pipe is generally ineffective to prevent such escaping dust from reaching and lodging in the chute sections.

SUMMARY OF THE INVENTION

It is therefore an object of the present invention to overcome the above-mentioned drawbacks inherent to the conventional apparatusses, and to provide a particulate material loading apparatus comprising a chute which is freely expandable, retractable, and bendable during a continuous loading operation, and a dust collector wherein minute dust particles in the chute as well as in the hood can be drawn off, thereby eliminating any dust leakage to the outside atmosphere.

It is another object of the present invention to provide such a loading apparatus wherein the collected dust powders are returned to the discharge path, which conserves the materials being handled and simultaneously eliminates any air pollution thereby.

Briefly, the loading apparatus according to the present invention comprises a chute assembly including an air-tight, expandable, bendable, outer pipe portion, at the interior of which an expandable and bendable guide pipe is provided for containing and directing the particulate materials being discharged. A hood member is connected at the bottom end of the chute, and is adapted to be moved up and down in response to the surface change or buildup of the accumulating materials. A concentric air passage is provided in the space between the inner and outer pipe portions to communicate any generated dust from the hood to the collector. Thus, any minute powders or dusts dispersed from the discharging material are effectively collected and drawn off during the loading operation, whereby air pollution is minimized and the handling capacity of the materials is greatly enchanced.

DETAILED DESCRIPTION OF THE PREFERRED EMBODIMENTS

Figure 1:
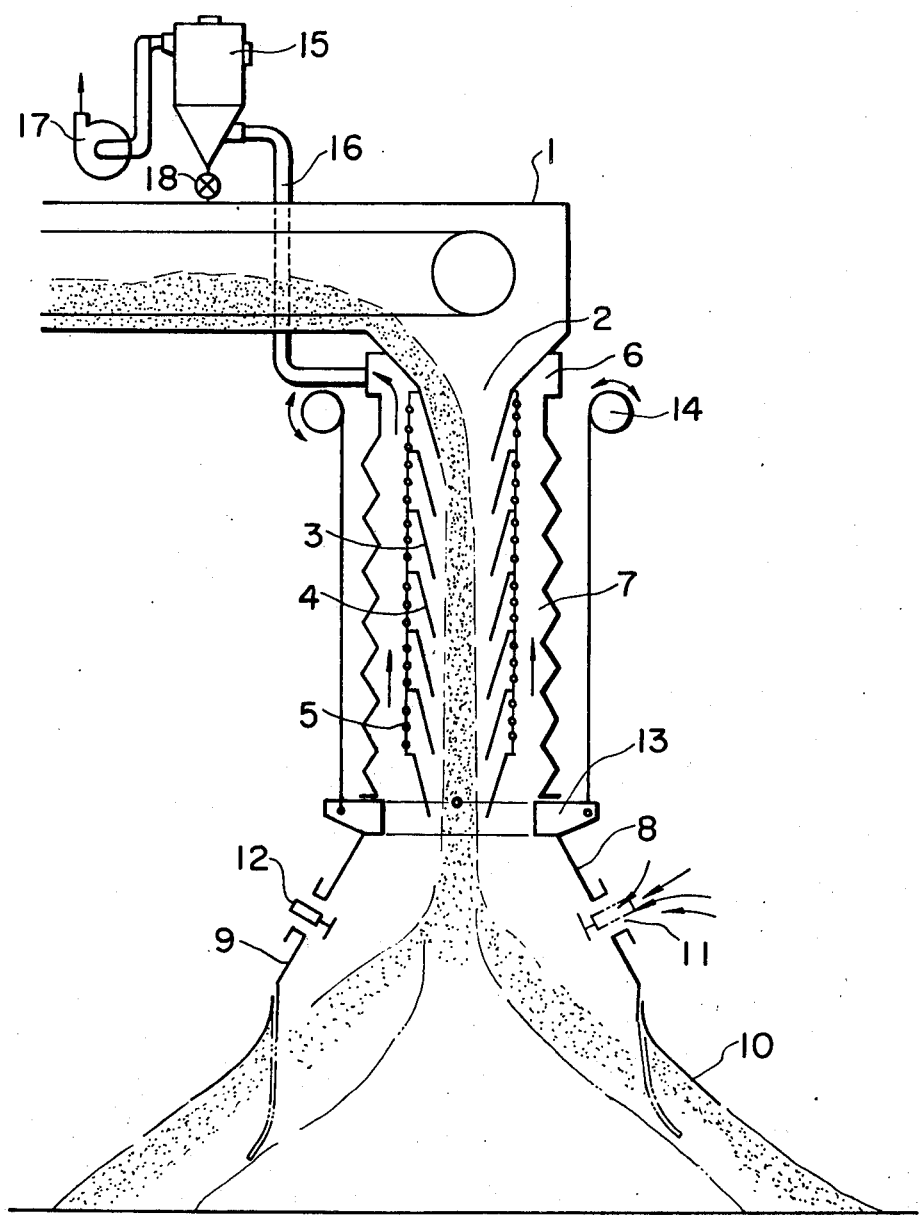
FIG. 1 shows a cross-sectional elevation, in simplified or schematic form, according to an embodiment of the present invention.

In FIG. 1, a conveyor housing 1 has a discharge opening 2 connected to the upper one of a plurality of short pipe members 4 vertically nested within each other to form a discharge pipe 3. The pipe members 4 are frosto-conical in shape, and the lower opening of each one is freely inserted into the upper opening of the member below. The pipe members 4 are vertically connected together by joined flanges or chains 5 to render the discharge pipe 3 both expandable and bendable. A duct frame 6 is provided around the outer peripheral surface of the discharge opening 2, to the lower end of which the upper end of a flexible accordion pipe 7 is secured. The pipe 7 is air-tight, expandable, and bendable, and concentrically surrounds the discharge pipe 3. A hood 8 is provided at the lower end of the accordion pipe 7, and consists of a main hood body 9 and a skirt 10. The main hood body 9 has a widening or flared configuration, and is air-tight. The flexible air-tight skirt 10 fans out from the lower edge of the main hood body 9, and overlies the irregular surface of the discharge material pile. At least three air intake ports 11 are provided on the main hood body 9, and an equal number of contact switches 12 for detecting the presence of the materials are positioned adjacent to or within the respective air intake ports. A support ring 13, having a configuration for allowing universal tilting movement, such as a double-gimballed gyro ring, is provided between the lower end of the accordion pipe 7 and the hood 8. The details of such a gimbal ring construction have not been shown in the interest of simplicity, and because they are well known in the art. The support ring 13 is connected to the ropes or lines of a winding apparatus 14 associated with the conveyer 1. The winding apparatus 14 and the contact switches 12 are electrically connected in a control circuit, as described below. A dust collector and precipitator 15 is positioned above the conveyer 1. The discharge port of the dust collector is connected to the upper portion of the conveyor housing 1 through a valve 18, and the intake port of the collector is connected to the duct frame 6 through a pipe 16. Reference numeral 17 designates a centrifugal air exhaust pump.

In operation, the discharged materials fall through the opening 2 and the pipe 3 to accumulate in a pile under the hood 8. Minute powders or dusts whirling up from the pile are drawn into the air flow through the intake ports 11, and the mixture travels to the dust collector and precipitator 15 through the annular space between the discharge pipe 3 and the accordion pipe 7, the duct frame 6, and the pipe 16. In the collector 15, the dust particles are precipitated out and fed back into the conveyer housing 1 through the valve 18. The pile of material under the hood 8 gradually builds up, and when it reaches the air intake ports 11 the contact switches 12 are actuated. The winding apparatus 14 is adapted to raise the hood 8, simultaneously contracting the pipes 3 and 7, when two of the switches 12 are actuated, and the winding operation is stopped when only one switch remains actuated.

Figure 2:
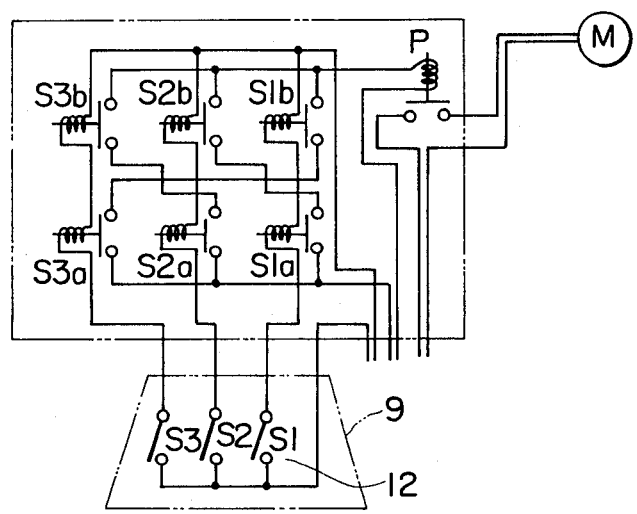
FIGS. 2 and 3 show schematic circuit diagrams for controlling the hood position in response to a plurality of detection switches.

FIG. 2 shows one example of an electric circuit for actuating the winding apparatus 14, wherein S1, S2 and S3 designate the three contact switches. S1a and S1b are relay contacts corresponding to switch S1, and in the same manner, S2a, S2b and S3a, S3b are relay contacts corresponding to switches S2 and S3, respectively. The relay contacts S1a and S2b, S2a and S3b, and S3a and S1b are connected in series, respectively, and these series circuits connected in parallel to form alternate paths for energizing the winding of a relay switch P, which in turn actuates the motor M of the winding apparatus 14. With such a circuit arrangement, when any two switches among S1, S2, and S3 are actuated, the winding apparatus begins to raise the hood 8 upwardly. A reversing circuit, not shown, is also provided for lowering the hood.

Figure 3:
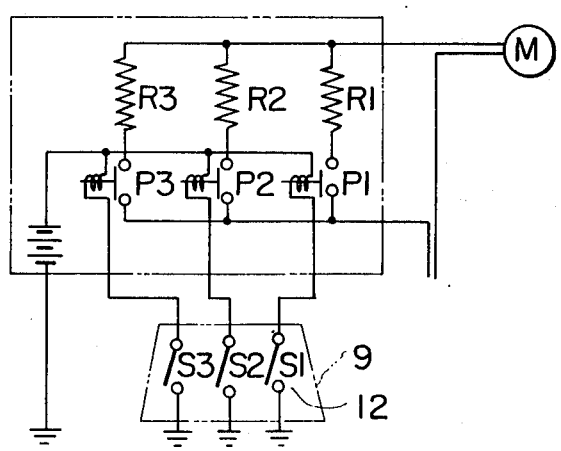

FIG. 3 shows another embodiment of an electrical circuit for controlling the speed of the winding apparatus 14 in response to the number of contact switches actuated. The circuit includes resistors R1, R2 and R3 and relay switches P1, P2 and P3, wherein R1 and P1, R2 and P2, and R3 and P3 are connected in series, and the three series circuits are in turn connected in parallel. The contact switches S1, S2, and S3 control the relay switches P1, P2, and P3, respectively. With this circuit arrangement, the winding speed of the apparatus 14 is porportional to the number of actuated contact switches. That is, the winding speed is slowest if only a single switch is actuated, and is fastest when all three switches are actuated, whereby an optimum hood raising is provided, wherein the lifting speed can more closely follow the buildup of the pile of discharged materials.

The skirt 10 spreads over the surface of the pile to prevent minute powders from leaking out from the lower portion of the hood 8. The skirt 10 is flexible and easily distorted to closely conform to the changing and irregular surface of the pile.

The hood 8 may be moved over the surface of the pile in three separate directions by reason of the gimballed support ring 13, to thereby maintain close contact between the lower edge of the hood and the pile surface. Thus, in loading the materials the hood 8 prevents the leakage of minute powders or dust, and simultaneously any powders that are generated within the chute and hood are drawn into the air flow from the intake ports 11 to the dust collector and precipitator 15, from which they are returned to the conveyor housing 1 through the valve 18.

The number of the air intake ports and contact switches is not limited to three, as shown in the disclosed embodiments, but any suitable number and arrangement may be employed depending on the overall loading apparatus design.

What is claimed is:

1. An apparatus for loading particulate materials, comprising:
   a. a discharge chute assembly including a flexible, longitudinally expandable and contractable outer pipe concentrically surrounding a flexible, longitudinally expandable and contractable inner pipe to define an annular space therebetween,
   b. a flared, skirted hood sealingly attached to the lower end of the chute assembly,
   c. a plurality of air inlet ports disposed in the hood,
   d. an equal plurality of switch means individually disposed adjacent the inlet ports for detecting the surface of a pile of particulate material being discharged through the inner pipe,
   e. winch means for controlling the vertical height of the hood and responsive to the actuation of the switch means for raising the hood, and simultaneously contracting the inner and outer pipes, to thereby maintain the hood skirt in contact with the pile surface,
   f. a dust collector and precipitator, and
   g. exhaust means for drawing air through the inlet ports and up through the annular space into the collector and precipitator, whereby dust generated by the discharged material is contained within the hood, mixed with the air flow, and delivered to the collector and precipitator.

2. An apparatus as defined in claim 1, further comprising a support ring disposed between and mounted to the lower end of the outer pipe and the narrower, upper end of the hood, and cable means connected between the support ring and the winch means.

3. An apparatus as defined in claim 2, wherein the outer pipe is a foldable accordion pipe, and the inner pipe comprises a plurality of nested, conical pipe sections connected together by flexible cable or chain means.

4. An apparatus as defined in claim 3, wherein there are at least three inlet ports and switch means, and further comprising a control circuit for energizing the winch means in response to the actuation of two of the switch means.

5. An apparatus as defined in claim 3, wherein there are at least three inlet ports and switch means, and further comprising a control circuit for energizing the winch means in proportion to the number of switch means actuated.

6. An apparatus as defined in claim 2, wherein the support ring is gimballed for universal movement, whereby the hood is easily deflectable to closely follow the changing surface shape of the pile of material.

7. An apparatus as defined in claim 1, wherein there are at least three inlet ports and switch means, and further comprising a control circuit for energizing the winch means in proportion to the number of switch means actuated.

8. An apparatus as defined in claim 1, wherein the outer pipe is a foldable accordion pipe, and the inner pipe comprises a plurality of nested, conical pipe sections connected together by flexible cable or chain means.

9. An apparatus as defined in claim 1, further comprising conveyor means for delivering particulate material to be discharged to the chute assembly, and means for returning dust particles separated out by the collector and precipitator to the conveyor means.

10. An apparatus as defined in claim 1, wherein there are at least three inlet ports and switch means, and further comprising a control circuit for energizing the winch means in response to the actuation of two of the switch means.

* * * * *